United States Patent
Amatsutsu

(10) Patent No.: US 6,237,969 B1
(45) Date of Patent: May 29, 2001

(54) CONNECTOR FOR CONNECTING SPIRALLY CORRUGATED PIPE TO WALL

(75) Inventor: Hiroyuki Amatsutsu, Osaka (JP)

(73) Assignee: Totaku Industries, Inc., Osaka (JP)

( * ) Notice: Subject to any disclaimer, the term of this patent is extended or adjusted under 35 U.S.C. 154(b) by 0 days.

(21) Appl. No.: 09/326,689

(22) Filed: Jun. 7, 1999

(30) Foreign Application Priority Data

Jun. 9, 1998 (JP) ................................................. 10-178069

(51) Int. Cl.$^7$ ...................................................... F16L 17/00
(52) U.S. Cl. ............................................ 285/357; 285/903
(58) Field of Search ............................. 285/357, 148.19, 285/205, 903, 139.2, 139.3, 141.1, 347

(56) References Cited

U.S. PATENT DOCUMENTS

| | | | | |
|---|---|---|---|---|
| 861,828 | * | 7/1907 | Grindrod et al. | 285/148.19 |
| 1,538,395 | * | 5/1925 | Gane | 285/357 |
| 2,172,532 | * | 9/1939 | Fentress | 285/357 |
| 2,503,169 | * | 4/1950 | Phillips | 285/903 |
| 4,289,334 | * | 9/1981 | Riley | 285/55 |
| 5,478,123 | * | 12/1995 | Kanao | 285/289 |
| 5,542,718 | * | 8/1996 | Gronwick et al. | 285/357 |
| 5,794,986 | * | 8/1998 | Gansel et al. | 285/173 |
| 5,845,946 | * | 12/1998 | Thomas | 285/348 |
| 5,971,444 | * | 10/1999 | Hawkins | 285/206 |
| 6,036,237 | * | 3/2000 | Sweeney | 285/322 |

FOREIGN PATENT DOCUMENTS

5302 * 4/1904 (GB) ....................................... 285/374

* cited by examiner

*Primary Examiner*—Teri Pham Luu
(74) *Attorney, Agent, or Firm*—McGuireWoods LLP

(57) ABSTRACT

There is disclosed a spirally corrugated pipe-connecting connector which enables a pipe to be quite easily fixed rapidly to a handhole or the like, and maintains a sealed condition between the inside and outside of the pipe, and enables an electric cable or the like to be passed through the pipe immediately after the pipe connecting operation is completed. The connector includes a tubular connector body 1 including a distal end-side tubular portion 11 for fixing to a wall W, an outwardly-flaring, tapering portion 12 holding a packing member, and a spiral projection portion 13 which is fitted on the holder, and is threaded inversely to a spiral on a pipe P at a pitch smaller than a pitch of the spiral on the pipe P, the tubular portion, the tapering portion and the spiral projection portion being arranged sequentially in this order from the wall W toward the exterior of the wall. The connector further includes a holder 2 which has a spiral projection 21 formed on an outer peripheral surface thereof for fitting engagement with the spiral projection portion 13, and also has a spiral projection 22 formed on an inner peripheral surface thereof for fitting engagement with the spiral on the outer peripheral surface of the pipe P, and the packing member 3 which is adapted to be fitted on a distal end portion of the pipe P, and is disposed within the tapering portion 12 of the connector body 1.

29 Claims, 8 Drawing Sheets

CONNECTOR FOR CONNECTING SPIRALLY CORRUGATED PIPE TO WALL

BACKGROUND OF THE INVENTION

1. Field of the Invention

This invention relates to a spirally corrugated pipe-connecting connector which is used to connect a spirally corrugated pipe to a wall of a cable relay site (e.g. a handhole or a manhole) when burying a cable (e.g. an electric cable, a telephone cable or an optical cable) protection conduit in the ground.

2. Related Art

When installing a cable conduit in the ground, handholes or manholes (hereinafter referred to as "handhole", representing both holes), serving as cable relay sites, have heretofore been provided at suitable intervals along the conduit. As is well known, when forming this handhole, a hole of a required depth is dug in the ground and concrete is placed in the thus dug hole to form a peripheral wall (side wall) of the handhole. At the same time, a through hole for enabling the connection of a cable conduit-forming pipe to the side wall is formed through the side wall of the handhole, and the conduit-forming pipe is connected to this through hole For connecting the pipe to the side wall or the handhole, mortar was heretofore poured and filled in a gap between the through hole in the side wall and the pipe passed through this through hole, and when the mortar was solidified, the pipe was fixed to the handhole, and a waterproof condition was achieved.

Therefore, in such conventional pipe connecting means, an experience was required in the mortar pouring operation, and much time and labor were required because the waterproof condition must be secured, and an operation for preventing the leakage of the mortar was needed. And besides, a waiting time for the curing of the mortar was required, and even when the connection of the pipe to the handhole was completed, a cable, such as an electric cable, could not immediately be passed through the pipe.

SUMMARY OF THE INVENTION

Therefore, this invention seeks to solve the problems with the conventional means for connecting a pipe to a handhole or the like, and an object of the invention is to provide a novel spirally corrugated pipe-connecting connector which enables the pipe to be quite easily fixed rapidly to the handhole or the like, and maintains a sealed condition between the inside and outside of the pipe, and enables an electric cable or the like to be passed through the pipe immediately after the pipe connecting operation is completed.

The above object of the invention has been achieved by a connector for connecting a spirally-corrugated pipe to a through hole portion of a wall, the connector according to the present invention comprising:

a tubular connector body including,
  a tubular portion fixed to the through hole portion,
  a spiral projection portion having a spiral projection which defines an inverse thread relative to a spiral formed on an outer periphery of the pipe, the inverse thread having a pitch smaller than a pitch of the spiral of the pipe, and
  a outwardly-flared taper portion interposed between the tubular portion and the spiral projection portion,
a holder for holding the pipe to the tubular connector body, a holder including,
  a outer spiral projection formed on an outer peripheral surface of the holder and threadedly engaged with the spiral projection portion, and
  a inner spiral projection formed on an inner peripheral surface of the holder and threadedly engaged with the spiral formed on the outer periphery of the pipe; and
a packing member disposed between the taper portion of the tubular connector body and a distal end of the outer periphery surface of the pipe for sealing a gap defined between the tubular connector body and the pipe.

DETAILED DESCRIPTION OF THE PREFERRED EMBODIMENTS

Figure 1:
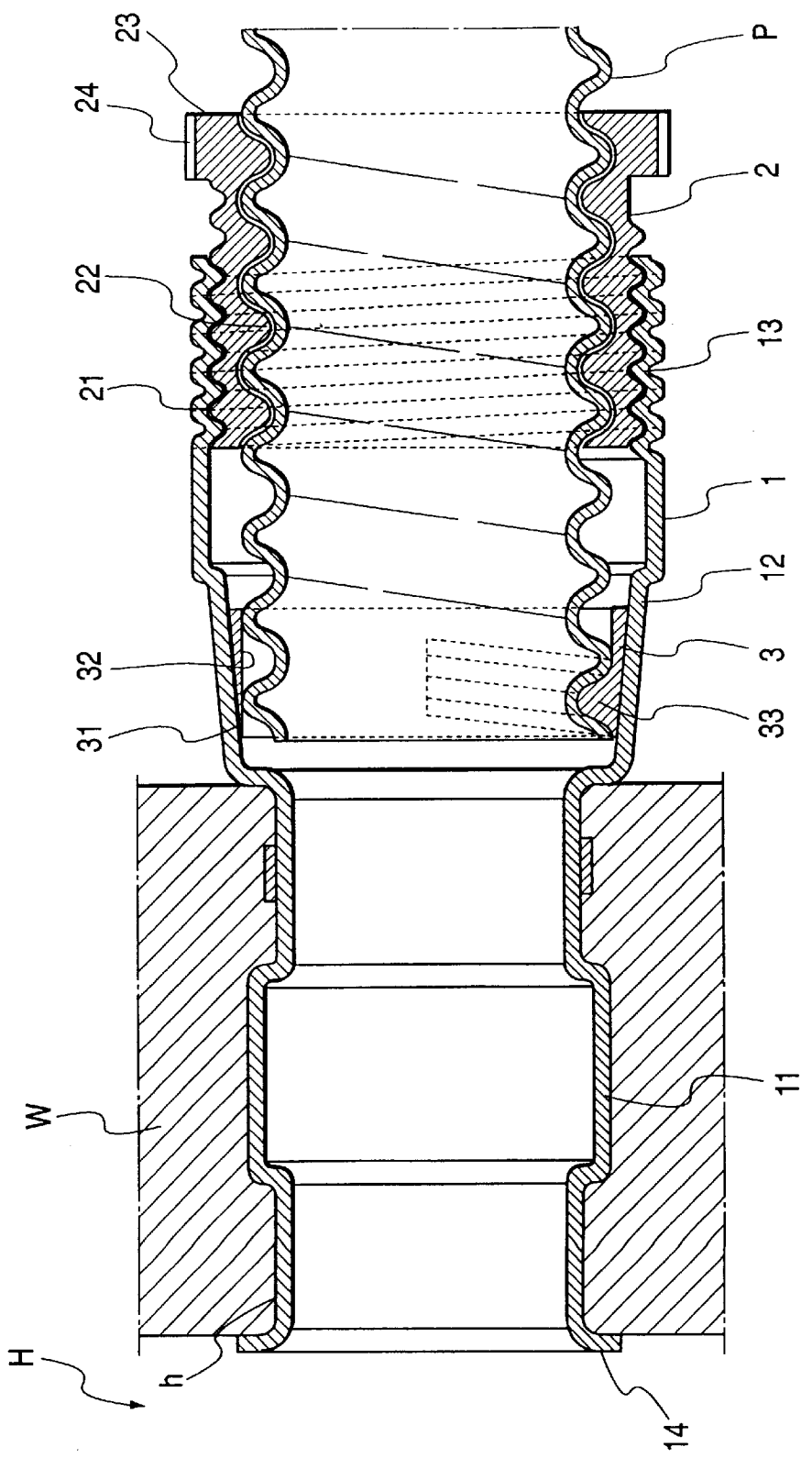
FIG. 1 is a vertical cross-sectional view showing important portions of a first embodiment of a connector.
Figure 2:
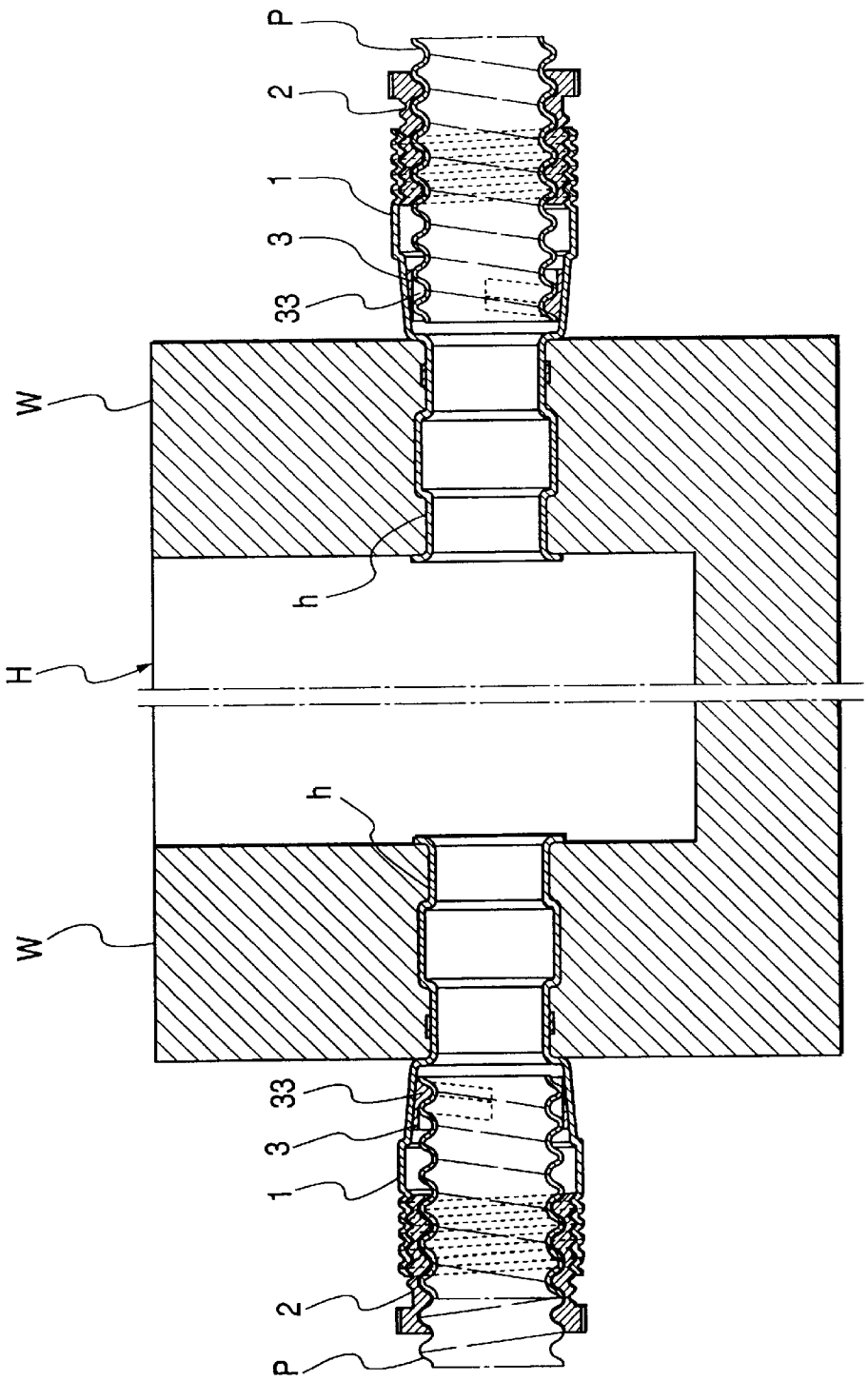
FIG. 2 is a vertical cross-sectional view showing a condition in which the connector is mounted on a handhole.
Figure 3:
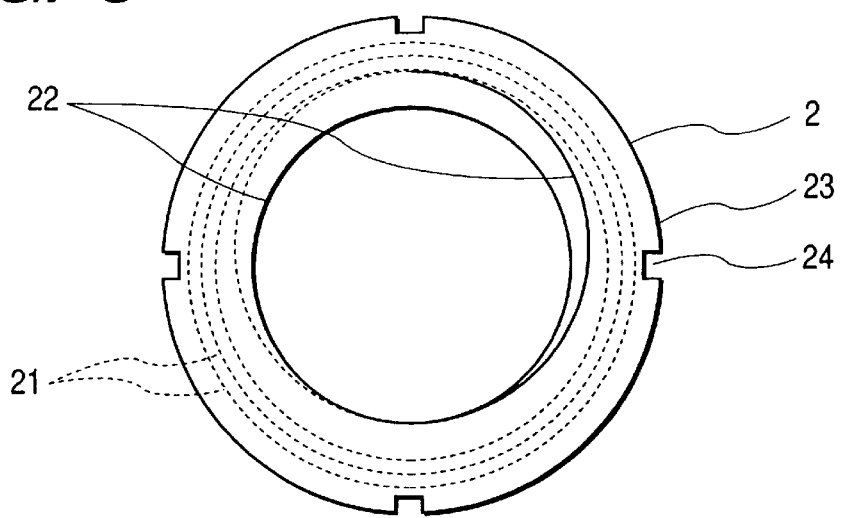
FIG. 3 is a rear view of a holder.
Figure 4:
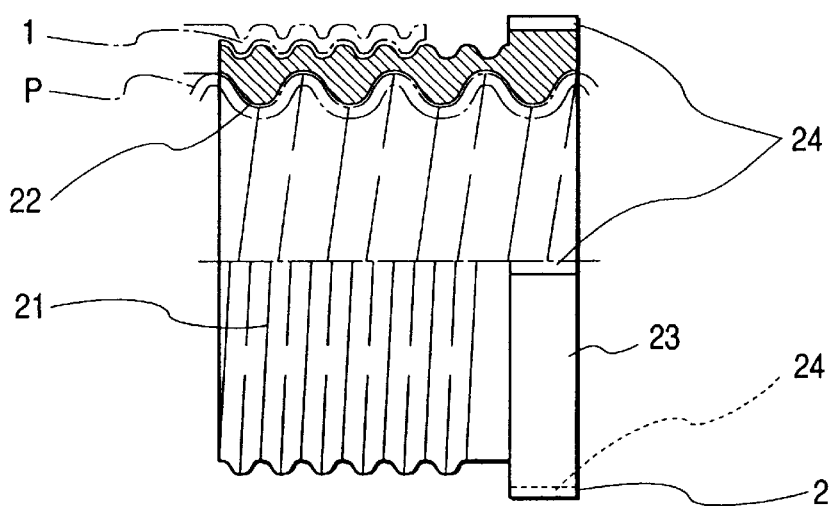
FIG. 4 is a half-cross-sectional, side-elevational view of the holder.
Figure 5:
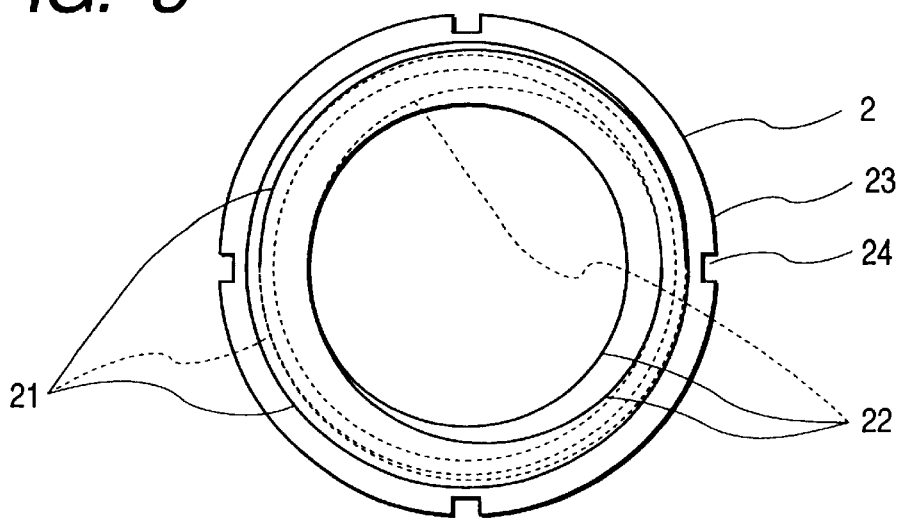
FIG. 5 is a front-elevational view of the holder.
Figure 6:
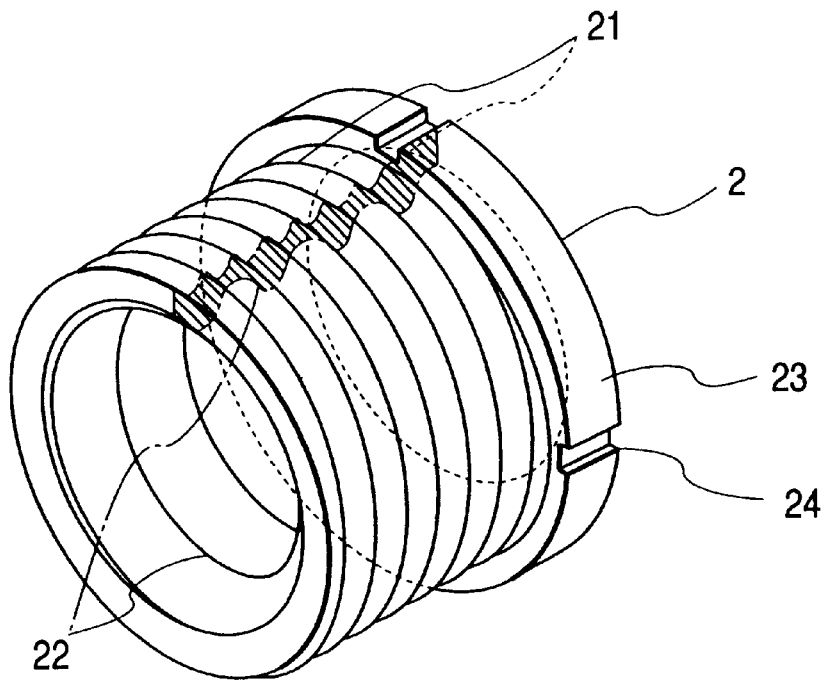
FIG. 6 is a perspective view of the holder.
Figure 7:
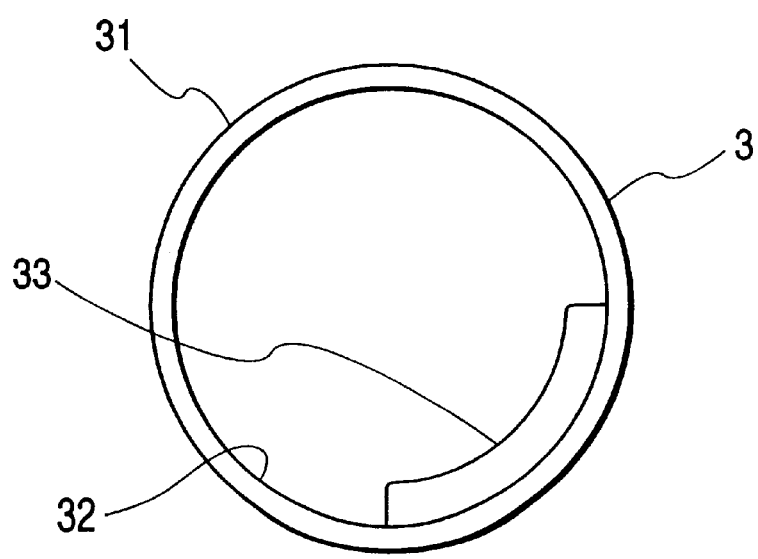
FIG. 7 is a rear view of a packing member.
Figure 8:
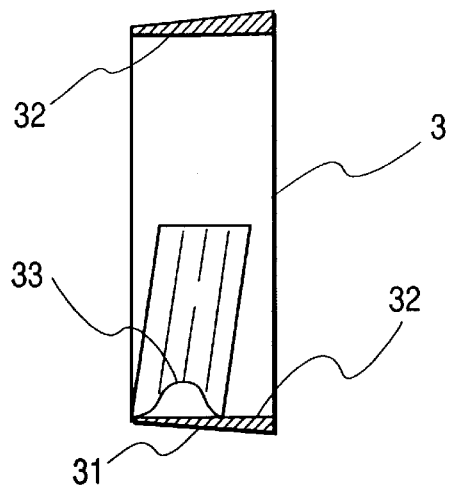
FIG. 8 is a vertical cross-sectional view of the packing member through center thereof.
Figure 9:
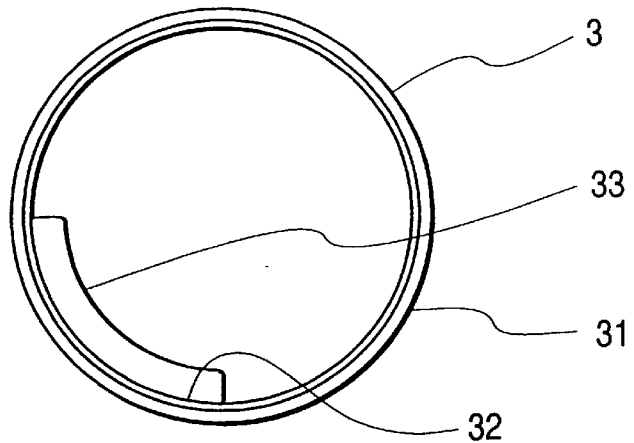
FIG. 9 is a front-elevational view of the packing member.
Figure 10:
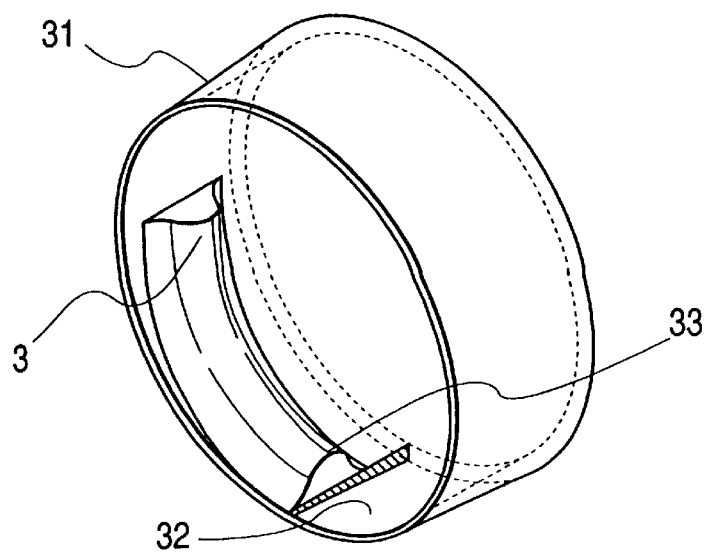
FIG. 10 is a perspective view of the packing member.

A preferred embodiment of the present invention will now be described with reference to the drawings. FIGS. 1 and 2 show a first embodiment of a connector of the invention, and FIG. 1 is a cross-sectional view showing the overall configuration of the connector during use, and FIG. 2 is a cross-sectional view of an important portion, showing a condition in which the connector is mounted an a handhole.

As shown in FIG. 1, the connector of the present invention comprises a connector body 1, a holder 2, and a packing member 3. As shown in FIGS. 1 and 2, the connector body 1 is in the form of a tube to be connected to the handhole H. More specifically, the connector body 1 includes a distal end-side tubular portion 11 adapted to be inserted into and fixed to a through hole h directly molded or formed through a wall W of the handhole H, a tapering portion 12 which is flaring away from the handhole H, and is adapted to hold the packing member 3 serving to form an air-tight seal between the connector body 1 and a pipe P forming a conduit for protecting a cable such as an electric cable, and a corrugated spiral projection portion 13 which is engaged with a spiral projection 21 formed on an outer peripheral surface of the holder 2, serving to hold the pipe P within the connector body 1, and is threaded inversely to a spiral on the outer periphery of the pipe P at a pitch smaller than the pitch of the spiral on the pipe P. The tubular portion 11, the tapering portion 12 and the spiral projection portion 13 are formed integrally with each other, and are arranged sequentially in this order. The connector body 1 of this embodiment further includes an outwardly-directed, bell mouth-like flange 14 formed at the distal end thereof (exposed to the interior of the handhole H) for guiding the cable (e.g. an electric cable) when feeding the cable into and out of the pipe.

The tubular portion 11 of the connector body 1 is molded in the concrete wall when the handhole 11 is built, and as a result the connector body 1 extends through the through hole h, formed through the wall W, and is fixed in a manner to form the conduit. The connector body 1 may be fixed to the wall W when the handhole H is built, as described above, but when the connector body is to be mounted on a handhole already formed, the connector body 1 may be fixed by inserting the tubular portion 11 into the preformed through hole h and then by filling mortar in a gap therebetween.

As shown in FIGS. 3 to 6, like the connector body 1, the holder 2 is molded by well-known injection molding, using a polyethylene resin. This holder has a tubular shape as a whole, and the spiral projection 21 for engagement with the spiral projection portion 13 on the connector body 1 is formed on the outer peripheral surface of this holder. A spiral projection 22 for engagement with the spirally-corrugated outer peripheral surface of the pipe P is formed on the inner peripheral surface of the holder. A flange 23 is formed at an outer end of the holder remote from the wall W, and a plurality of notches 24 are formed in an outer peripheral surface of the flange 23, and an operating tool can be engaged in these notches so as to rotate the holder in the circumferential direction.

As shown in FIGS. 7 to 10, the packing member 3 of an annular shape is made of rubber, and its outer peripheral surface is formed into a conical surface 31 so shaped and sized as to be held in intimate contact with the inner peripheral surface of the tapering portion 12 of the connector body 1. The inner peripheral surface of this packing member is formed into a cylindrical surface 32 having such a diameter that this cylindrical surface 32 can be fitted on the spirally-corrugated outer peripheral surface of the pipe P in intimately-contacted relation thereto. A spiral protuberance 33 is formed integrally on the inner peripheral surface of the packing member, and this spiral protuberance 33 can be fitted in a recess of the spirally-corrugated outer peripheral surface of the pipe P in intimately-contacted relation thereto, and the packing member is threaded and mounted on the distal end portion of the pipe P. The packing member 3 is provided for the purpose of preventing moisture from intruding from a region around the pipe P into the interior of the handhole H, and therefore it is preferred that the length of the packing member in its axial direction be at least not less than 1 pitch of the spiral projection on the outer peripheral surface of the pipe P. The spiral protuberance 33 is provided for the purpose of preventing the intrusion of moisture through the recess of the above spiral corrugation on the outer peripheral surface, and therefore this spiral protuberance 33 does not need to cover a portion of the recess of the pipe P, corresponding to one pitch, over the entire circumference thereof, and in this embodiment this spiral protuberance circumferentially extends over an angle of 90° relative to the recess.

Figure 11:
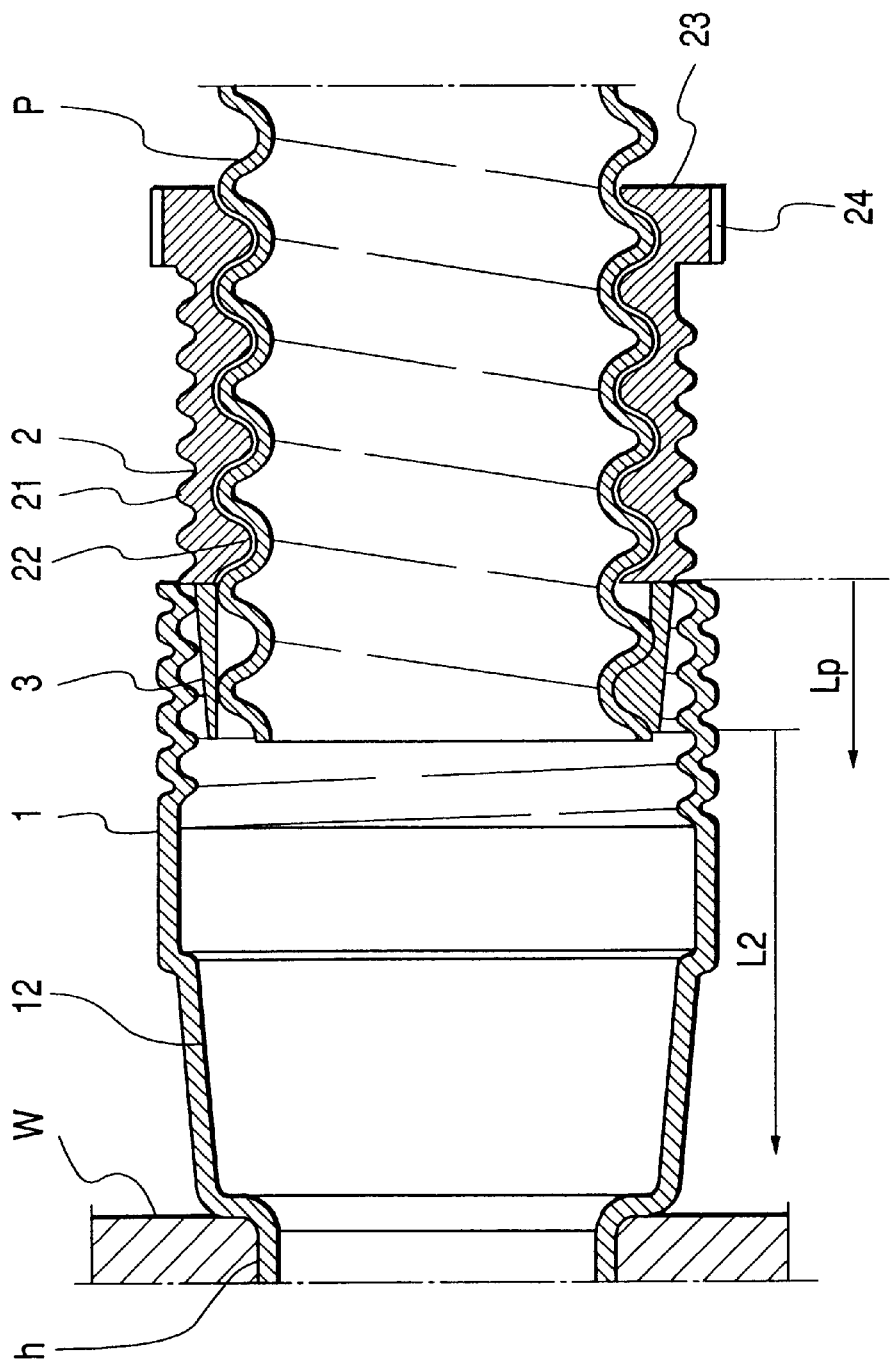
FIG. 11 is a vertical cross-sectional view showing the manner of use of the first embodiment.

An example of use of the connector (comprising the above members) when connecting the spirally corrugated pipe P to the handhole H will now be described with reference to FIG. 11. First, the holder 2 is brought into contact with the distal end of the cable conduit-forming spirally corrugated pipe P, with the flange 23 disposed close to this distal end, and the holder 2 is rotated to be fitted on the pipe P. Then, similarly, the annular packing member 3 is fitted on the distal end portion of the pipe P. Thereafter, the distal end of the pipe is inserted into the outer end of the connector body 1 beforehand fixed to the wall W of the handhole H.

Then, the holder 2 is rotated around the outer peripheral surface of the pipe P so as to engage the spiral projection 21 on the outer peripheral surface thereof with the spiral projection portion 13 of the connector body 1, thereby moving the holder 2 into the connector body 1. In this case, the pitch of the spiral projection 22 on the inner surface of the holder 2 (and hence the pitch of the spiral corrugation on the outer peripheral surface of the pipe P) is larger than the pitch of the spiral projection 21 on the outer peripheral surface of the holder 2 (and hence the pitch of the spiral projection portion 13 of the connector body 1), and therefore as the holder 2 moves (for example, a distance Lp) within the connector body 1 toward the handhole H, the pipe P is linearly moved relative to the holder 2 by a larger distance (L2) corresponding to the pitch ratio, iso that the conical surface 31 of the packing member 3, fitted on the distal end portion of this pipe, is brought into contact with the inner peripheral surface of the tapering portion 12 of the connector body 1. At this time, although only an ordinary propelling force is applied to the pipe P by the holder 2, a large pressure, acting in a direction perpendicular to the conical surface 31, is produced at the contact surface because of the effect of the slanting surface, so that the packing member 3 is sufficiently pressed against the tapering portion 12, and the pipe P is sealed relative to the external environment.

Although not shown in the drawings, for rotating the holder 2, the holder-rotating tool is engaged in the notches 24 in the flange 23 of the holder 2, and in rotated. As another example, the flange 23 may have a polygonal shape so as to be rotated by a tool. As a further example, (knurl-like) pits and projections may be formed on the flange 23 in a peripheral direction so that the holder can be easily rotated with the hand.

Figure 12:
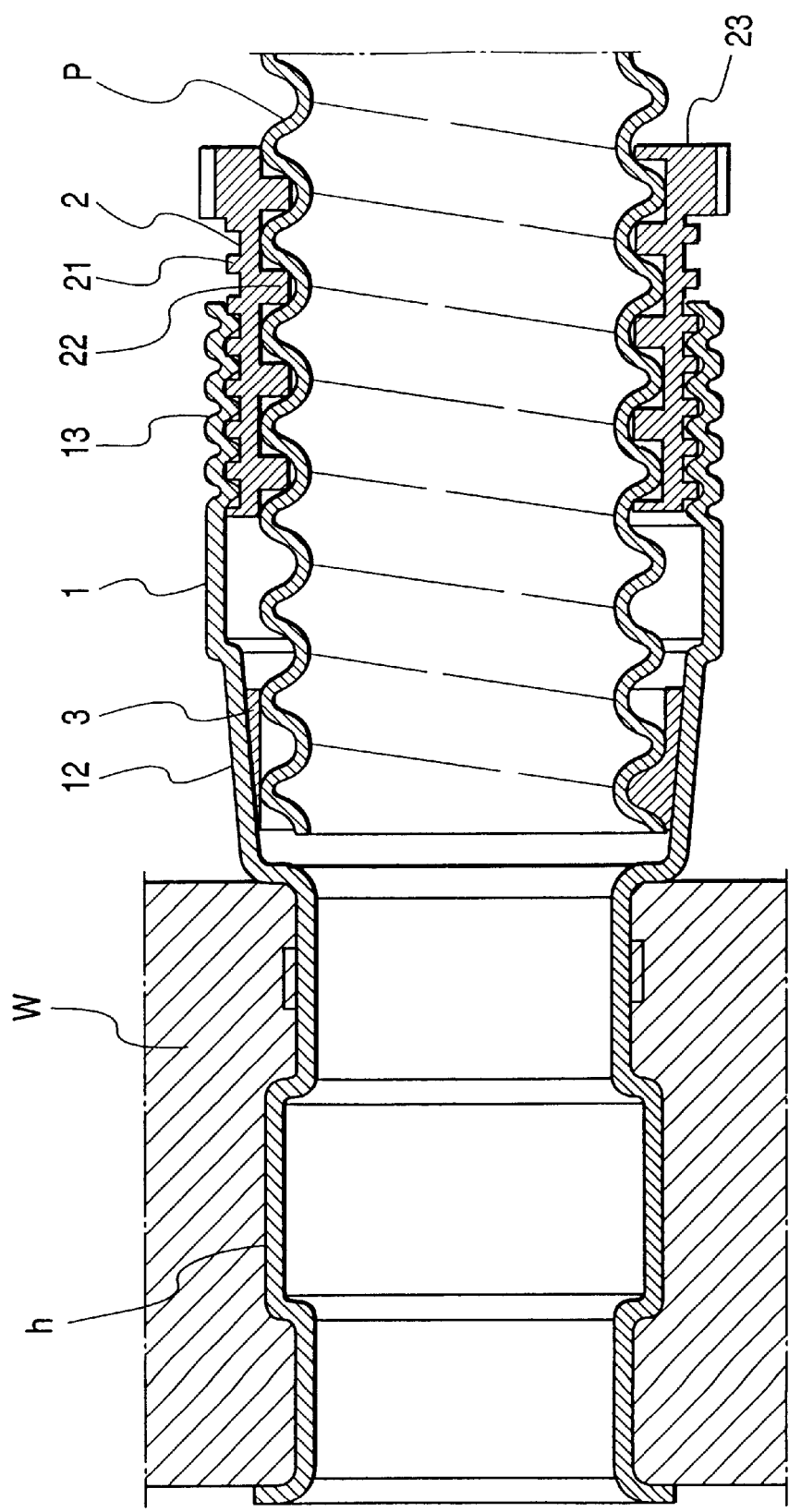
FIG. 12 is a vertical cross-sectional view similar to FIG. 1, but showing a second embodiment.

FIG. 12 is a cross-sectional view similar to FIG. 1, but showing a second embodiment. This embodiment differs from the first embodiment that a spiral projection 21 of a holder 2 for the connector body 1 and a spiral projection 22 of the holder 2 for the pipe P are each in the form of a rib-like projection as can be seen from its cross-sectional shape. The other portions are similar to those of the first embodiment This second embodiment has an advantage that a mold for forming the holder 2 can be produced relatively easily. As a modification of this second embodiment, one of the spiral projection 21 and the spiral projection 22 may be in the form of a rib-like projection.

Figure 13:
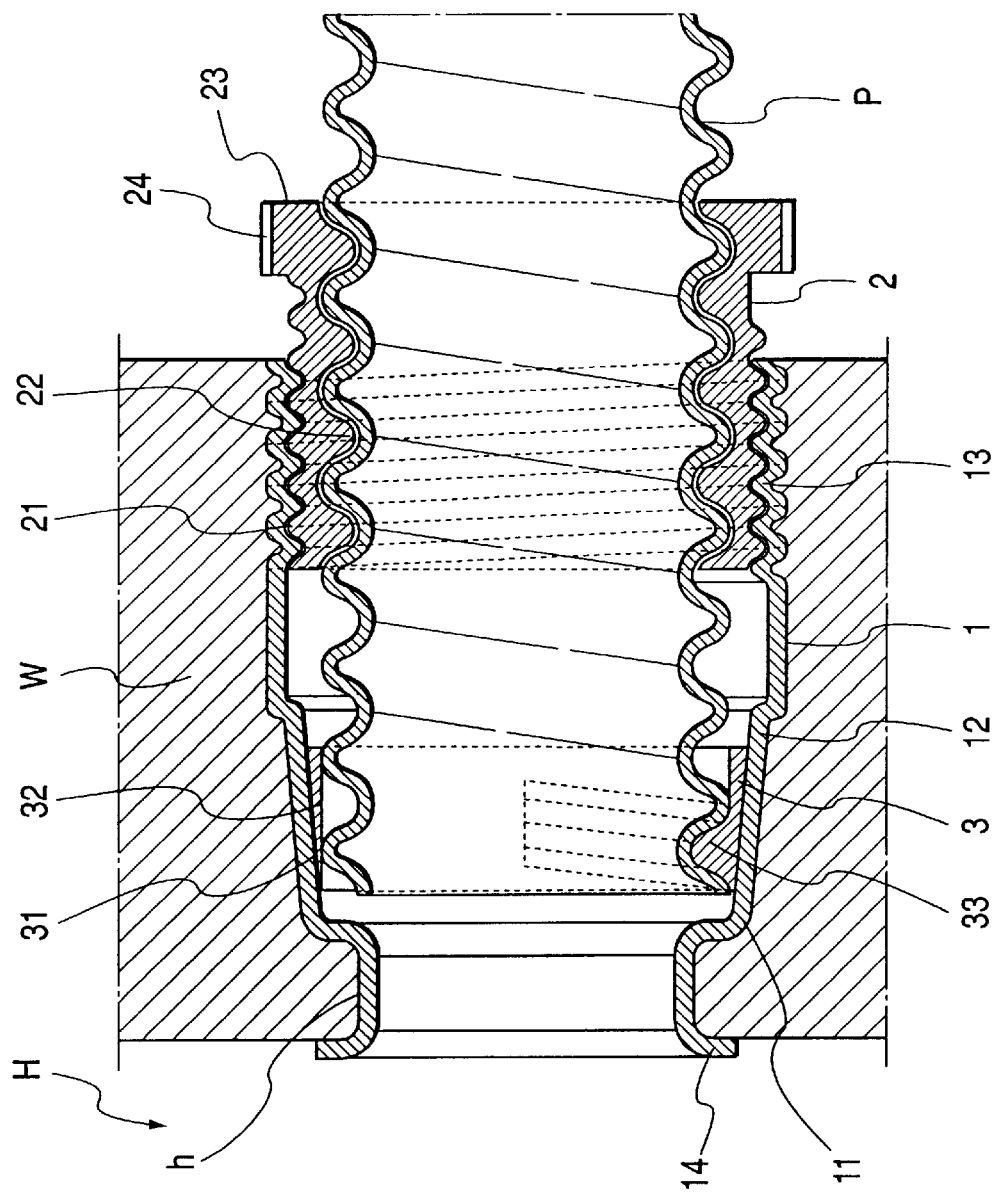
FIG. 13 is a vertical cross-sectional view similar to FIG. 1, but showing a third embodiment.

FIG. 13 is a view similar to FIG. 1, but showing a third embodiment. This embodiment differs from the first embodiment in that the overall length of a connector body 1 is generally equal to the thickness of a handhole-forming wall W. Therefore, as shown in this Figure, a tapering portion 12 and a spiral projection portion 13 are received in the handhole wall W. The other portions are similar to those of the first embodiment.

The present invention is based on Japanese Patent Application No. Hei. 10-178069, which is incorporated herein by reference.

Although the representative embodiments of the present invention have been described above, the present invention is not limited to these embodiments, and suitable modifications can be made in so far as the above-mentioned features of the invention are provided, and the object of the present invention is achieved, and the following advantageous effects are achieved.

As is clear from the foregoing description, in the connector of the present invention, the pipe, having the cable or the like passed therethrough for protection purposes, is connected to the connector body, mounted on the handhole or other wall, with the holder disposed therebetween. This holder includes the spiral projection for engagement with the spiral on the outer periphery of the pipe, and the spiral projection which is adapted to be engaged with the spiral projection portion formed on the connector body and is threaded inversely to the first-mentioned spiral projection at a pitch different from a pitch of the first-mentioned spiral projection. The packing member is press-fitted between the connector body and the pipe simultaneously when the above connection is effected. Therefore, merely by fitting the packing member on the distal end portion of the pipe and then by rotating the holder, the pipe can be quite easily fixedly mounted rapidly on the wall of the handhole or the like. And besides, the sealed condition between the inside and outside of the pipe can be maintained. Furthermore, there can be expected an excellent advantage that the electric cable or the like can be passed through the pipe immediately after this pipe connecting operation is completed.

What is claimed is:

1. A connector for connecting a spirally-corrugated pipe to a through hole portion of a wall, said connector comprising:
    a tubular connector body including,
        a tubular portion for attachment to said through hole portion of the wall,
        a corrugated portion having a spiral projection which defines an inverse thread relative to a spiral formed on an outer periphery of said pipe, said inverse thread having a pitch smaller than a pitch of said spiral of said pipe, and
        an outwardly-flared tapered portion interposed between said tubular portion and said corrugated portion,
    a holder for holding said pipe to said tubular connector body, said holder including,
        an outer spiral projection formed on an outer peripheral surface of said holder and threadedly engaged with said corrugated portion, and
        an inner spiral projection formed on an inner peripheral surface of said holder and threadedly engaged with said spiral formed on the outer periphery of said pipe; and
    a packing member disposed between said taper portion of said tubular connector body and a distal end of said outer periphery surface of said pipe for sealing a gap defined between said tubular connector body and said pipe.

2. The connector according to claim 1, wherein said wall is a side wall forming one of a handhole and a manhole.

3. The connector according to claim 1, wherein said packing member is provided with a portion having a tapered cross-section in a longitudinal direction of said pipe.

4. The connector according to claim 1, wherein said packing member is provided with a protuberance extending from an inner surface of said packing member and which is brought in close engagement with said spiral of said outer periphery of said pipe.

5. The connector according to claim 1, wherein a length of the whole of said tubular connector body in a longitudinal direction of said pipe is adapted to be substantially equal to a thickness of said wall in an axial direction of said through hole portion.

6. The connector according to claim 1, wherein said tubular connector body includes an outwardly-directed, bell mouth-like flange formed at a distal end of said tubular connector body opposing said outwardly-flared taper portion.

7. The connector according to claim 1, wherein said holder includes a flange formed at an outer end thereof.

8. The connector according to claim 7, wherein said flange includes a plurality of notches formed in an outer peripheral surface of said flange.

9. The connector according to claim 7, wherein said flange has a polygonal shape.

10. The connector according to claim 1, wherein said packing member has an annular shape.

11. The connector according to claim 10, wherein said packing member is made of rubber.

12. The connector according to claim 1, wherein said packing member includes an outer peripheral surface formed into a conical surface in contact with an inner peripheral surface of said outwardly-flared taper portion.

13. The connector according to claim 12, wherein said inner peripheral surface of said packing member is a cylindrical surface having a diameter adapted to be fitted on the spiral formed on the outer periphery of said pipe.

14. The connector according to claim 13, wherein said inner and outer spiral projections of said holder are rib-like projections.

15. The connector according to claim 1, wherein a spiral protuberance is formed integrally on an inner peripheral surface of said packing member.

16. A connector for connecting a spirally-corrugated pipe to a hole portion of a mating member, said connector comprising:
    a tubular connector body including,
        a tubular portion fixed to said hole portion of the mating member,
        a corrugated portion having a spiral projection, and
        an outwardly-flared taper portion interposed between said tubular portion and said corrugated portion,
    a holder for holding said pipe to said tubular connector body, said holder including,
        a first spiral projection threadedly engaged with said corrugated portion, and
        a second spiral projection threadedly engaged with a spiral formed on an outer periphery of said pipe; and
    a packing member disposed between said taper portion of said tubular connector body and a distal end of said outer periphery surface of said pipe for sealing a gap defined between said tubular connector body and said pipe.

17. The connector according to claim 16, wherein said mating member is a wall with a through hole and said spirally-corrugated pipe is connected to the through hole portion of the wall by said connector.

18. The connector according to claim 17, wherein said wall is a side wall forming one of a handhole and a manhole.

19. The connector according to claim 17, wherein a length of said tubular connector body in a longitudinal direction of said pipe is adapted to be substantially equal to a thickness of said wall in an axial direction of said through hole portion.

20. The connector according to claim 16, wherein said spiral projection of said corrugated projection portion defines an inverse thread relative to said spiral formed on an outer periphery of said pipe.

21. The connector according to claim 20, wherein said corrugated portion is formed on an inner peripheral surface of said tubular connector body, said first spiral projection is formed on an outer peripheral surface of said holder and said second spiral projection is formed on an inner peripheral surface of said holder.

22. The connector according to claim 21, wherein said inverse thread of said corrugated projection portion has a pitch different from a pitch of said spiral of said pipe.

23. The connector according to claim 22, wherein said inverse thread of said corrugated projection portion has the pitch smaller than the pitch of said spiral of said pipe.

24. The connector according to claim 21, wherein said first spiral projection and said second spiral projection are formed integrally on said holder.

25. The connector according to claim 21, wherein said mating member is a wall with a through hole and said spirally-corrugated pipe is connected to the through hole portion of the wall by said connector.

26. The connector according to claim 20, wherein said inverse thread of said corrugated projection portion has a pitch different from a pitch of said spiral of said pipe.

27. The connector according to claim 26, wherein said inverse thread of said corrugated projection portion has the pitch smaller than the pitch of said pipe.

28. The connector according to claim 20, wherein said mating member is a wall with a through hole, and said spirally-corrugated pipe is connected to the through hole portion of the wall by said connector.

29. The connector according to claim 20, wherein said first spiral projection and said second spiral projection are formed integrally on said holder.

* * * * *